(12) United States Patent  
Ghasr et al.

(10) Patent No.: US 9,046,605 B2  
(45) Date of Patent: Jun. 2, 2015

(54) THREE-DIMENSIONAL HOLOGRAPHICAL IMAGING

(71) Applicant: The Curators of the University of Missouri, Columbia, MO (US)

(72) Inventors: Mohammad Tayeb Ghasr, Rolla, MO (US); Reza Zoughi, Wildwood, MO (US)

(73) Assignee: The Curators of the University of Missouri, Columbia, MO (US)

( * ) Notice: Subject to any disclaimer, the term of this patent is extended or adjusted under 35 U.S.C. 154(b) by 305 days.

(21) Appl. No.: 13/668,445

(22) Filed: Nov. 5, 2012

(65) Prior Publication Data

US 2014/0125516 A1 May 8, 2014

(51) Int. Cl.  
*G01S 13/89* (2006.01)  
*G01S 13/90* (2006.01)  
*G01S 13/32* (2006.01)

(52) U.S. Cl.  
CPC *G01S 13/90* (2013.01); *G01S 13/32* (2013.01)

(58) Field of Classification Search  
CPC ....... G01S 13/89; G01S 13/887; G01S 13/32; G01S 13/90  
USPC .......................... 342/22, 25 R–25 F, 173, 179  
See application file for complete search history.

(56) References Cited

U.S. PATENT DOCUMENTS

| 4,721,901 | A |  | 1/1988 | Ashley |
| 4,805,627 | A |  | 2/1989 | Klingenbeck et al. |
| 4,885,592 | A |  | 12/1989 | Kofol et al. |
| 4,901,084 | A |  | 2/1990 | Huguenin et al. |
| 4,916,457 | A |  | 4/1990 | Foy et al. |
| 5,073,782 | A |  | 12/1991 | Huguenin et al. |
| 5,148,182 | A |  | 9/1992 | Gautier et al. |
| 5,263,193 | A | * | 11/1993 | Lammers et al. ............. 455/315 |

(Continued)

FOREIGN PATENT DOCUMENTS

| AU | 746997 B2 | 4/1999 |
| CA | 2304782 C | 3/2007 |

(Continued)

OTHER PUBLICATIONS

International Search Report dated Jan. 30, 2014 regarding PCT Patent Application Application No. PCT/US2013/68278, 3 pages.

(Continued)

*Primary Examiner* — John B Sotomayor  
*Assistant Examiner* — Marcus Windrich  
(74) *Attorney, Agent, or Firm* — Senniger Powers LLP

(57) ABSTRACT

A holographic imaging system including a transmission line coupled to an antenna at one end and to a signal source at another end. The antenna defines an aperture through which a signal generated by the signal source is transmitted incident to an object located remotely from the aperture and through which a signal reflected from the object is received by the antenna aperture. A standing wave probe phase-referenced to the antenna aperture samples the reflected signal. A detector connected to the standing wave probe receives the sampled reflected signal and provides an output signal that represents a real-valued signal proportional to an in-phase component of the reflected signal from the object. A processor executes an imaging algorithm for generating a multi-dimensional profile representative of the object based on the output signal from the detector.

15 Claims, 6 Drawing Sheets

(56) References Cited

U.S. PATENT DOCUMENTS

| | | | |
|---|---|---|---|
| 5,661,494 A | 8/1997 | Bondyopadhyay | |
| 5,748,003 A * | 5/1998 | Zoughi et al. | 324/644 |
| 5,861,839 A | 1/1999 | Upton et al. | |
| 6,359,446 B1 | 3/2002 | Little, Jr. | |
| 6,448,788 B1 | 9/2002 | Meaney et al. | |
| 6,476,772 B1 | 11/2002 | Smith et al. | |
| 6,563,462 B1 | 5/2003 | Moffa et al. | |
| 6,624,781 B1 * | 9/2003 | Collins | 342/22 |
| 6,653,847 B2 | 11/2003 | Little, Jr. | |
| 6,657,580 B1 | 12/2003 | Edwards et al. | |
| 6,762,726 B2 | 7/2004 | Alden et al. | |
| 6,777,684 B1 | 8/2004 | Volkov et al. | |
| 7,187,337 B2 | 3/2007 | Aikawa et al. | |
| 7,221,181 B2 * | 5/2007 | Chao et al. | 324/95 |
| 7,511,658 B1 * | 3/2009 | Grebennikov et al. | 342/175 |
| 7,952,515 B2 * | 5/2011 | McEwan | 342/156 |
| 8,121,544 B2 | 2/2012 | Shimizu et al. | |
| 8,203,498 B2 | 6/2012 | Rao et al. | |
| 2003/0034444 A1 | 2/2003 | Chadwick et al. | |
| 2005/0200530 A1 | 9/2005 | Aikawa et al. | |
| 2005/0212705 A1 | 9/2005 | Legay et al. | |
| 2007/0205936 A1 | 9/2007 | McMakin et al. | |
| 2010/0033709 A1 | 2/2010 | Lampin et al. | |
| 2010/0176789 A1 | 7/2010 | Zoughi et al. | |
| 2010/0289713 A1 | 11/2010 | Taura | |
| 2010/0321235 A1 * | 12/2010 | Vossiek et al. | 342/25 A |
| 2010/0328142 A1 | 12/2010 | Zoughi et al. | |
| 2012/0262009 A1 * | 10/2012 | Becker et al. | 307/113 |

FOREIGN PATENT DOCUMENTS

| | | |
|---|---|---|
| JP | 06-252637 | 9/1994 |
| JP | 11-068448 | 3/1999 |
| JP | 2000-223926 | 8/2000 |
| NZ | 503713 | 8/2001 |
| WO | 99/15883 | 4/1999 |
| WO | 2006/017385 A1 | 2/2006 |
| WO | 2007/052112 A1 | 5/2007 |

OTHER PUBLICATIONS

Written Opinion dated Jan. 30, 2014 regarding PCT Patent Application Application No. PCT/US2013/68278, 6 pages.

* cited by examiner

Original Complex Data

Real-valued data, d = 0 mm

Real-valued data, d = 20 mm

THREE-DIMENSIONAL HOLOGRAPHICAL IMAGING

BACKGROUND

Conventional imaging is based on measuring the relative scattered field from a remote object over a known two-dimensional (2D) space and then using various imaging algorithms (e.g., synthetic aperture, holographical, reconstruction techniques, and the like) to detect properties of the object. Different reconstruction techniques may be used to produce an image (e.g., dielectric distribution and geometrical features) of the object. Although there are many different approaches for imaging at microwave and millimeter wave frequencies, each imaging approach has a limiting feature (e.g., hardware or reconstruction algorithms). For example, microwave three-dimensional (3D) imaging methods that use synthetic aperture radar (SAR) imaging techniques typically require a coherent vector (e.g., magnitude and phase) measurement obtained over a 2D surface.

In a typical system, a vector reflectometer is scanned on a one-dimensional (1D) or 2D plane to acquire data (e.g., phase) representative of a sample under test. A computer controls the scanning and data acquisition processes and passes the acquired data through a SAR algorithm to produce a 2D or 3D image of the sample under test.

Three-dimensional imaging requires a wideband signal, especially for obtaining high range resolution. But, designing a radio frequency (RF) receiver with a high dynamic range at very high frequencies (e.g., microwave and millimeter wave) to provide wideband vector measurement is technically difficult and costly. To obtain an image, the reflectometer must be calibrated such that all the phase measurements are referenced to the reflectometer's antenna aperture; or the reflectometer's phase center, which changes as a function of frequency, for all frequencies within the band.

For instance, a homodyne full quadrature reflectometer provides an in-phase and a quadrature signal proportional to the real and imaginary parts of the reflected wave, respectively. An advantage of a homodyne full quadrature reflectometer is the receiver can be calibrated to remove the effect of unwanted signals, such as those reflected from various connections and to make the measurements phase referenced to the reflectometer's antenna aperture. For wideband frequency operation, the design of this reflectometer must be drastically altered towards a heterodyning scheme, which is technically difficult and costly due to the requirement of having multiple sources, mixers, amplifiers, and filters.

Another conventional reflectometer based on frequency modulated continuous wave (FM-CW) radars does not provide a vector measurement. Thus, it cannot be readily calibrated (e.g., phase referenced) to the antenna aperture, for imaging purposes.

Therefore, what is needed is a wideband imaging system that can be phase referenced to its antenna aperture.

SUMMARY

Briefly, aspects of the invention provide a homodyne reflectometer that has a real-valued output signal proportional to the in-phase component of a reflected signal at the aperture of the antenna. The reflectometer produces measurements which are phase referenced to the aperture of the antenna at all frequencies, requiring no additional calibration (i.e., phase referencing).

In one aspect, a holographic imaging system is provided that includes an antenna with a transmission line coupled to it. The transmission line is coupled to the antenna at one end and coupled to a signal source at another end. The antenna defines an aperture through which a signal generated by the signal source is transmitted incident to an object located remotely from the aperture and through which a signal reflected from the object is received by the antenna aperture. The imaging system further includes a standing wave probe (e.g. coupler) located at the antenna aperture for sampling the reflected signal, and a detector connected to the standing wave probe. The detector is configured to receive the sampled reflected signal and provide an output signal that represents a real-valued signal proportional to an in-phase component of the reflected signal from the object. The imaging system also includes a processor that is configured to execute an imaging algorithm for generating a multi-dimensional profile representative of the object based on the output signal from the detector.

In another aspect, an imaging system is provided that includes a network device having a first port, a delta port, a second port, and a summing port. A signal source connected to the summing port provides a very high frequency signal, and the network device splits the very high frequency signal into a first signal and second signal. The imaging system also includes a reference line connected to the first port of the network device for receiving the first signal. In addition, the imaging system includes a reference load connected to the reference line. The reference load is configured to reflect the first signal to produce a first reflected signal transmitted from the reference load along the reference line to the network device. Further, the imaging system includes an antenna line connected to the second port of the network device to receive the second signal. The antenna line and the reference line are configured to have substantially equal electrical properties. In addition, an antenna is connected to the antenna line. The antenna is configured to transmit the second signal to a remote object, receive at least one second reflected signal from the remote object, and transmit the second reflected signal along the antenna line to the network device. The first reflected signal transmitted along the reference line and the second reflected signal transmitted along the antenna line combine within the network device to form a combined signal. The imaging system also includes a detector connected to the delta port. The detector samples the combined signal such that the detector measures a real part of the combined signal. The imaging system also includes a processor configured to execute an imaging algorithm to generate a multi-dimensional profile representative of the object based on a received output voltage proportional to the real part of the reflected signal from the detector.

In yet another aspect, a method of imaging a remote object using an antenna connected to an x-y scanning platform is provided. The method includes transmitting a signal from a source via the antenna and incident to the object. The signal source is configured to provide an electromagnetic energy source ranging in frequencies up to and including a tetrahertz frequency range. Further, the method includes receiving, by a detector probe positioned near an aperture of the antenna, a signal reflected from the object, wherein the detector probe is configured to sample a magnitude of the reflected signal. In addition, the method includes receiving a voltage output from the detector probe, wherein the voltage represents a real-valued signal proportional to an in-phase component of the reflected signal from the object.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
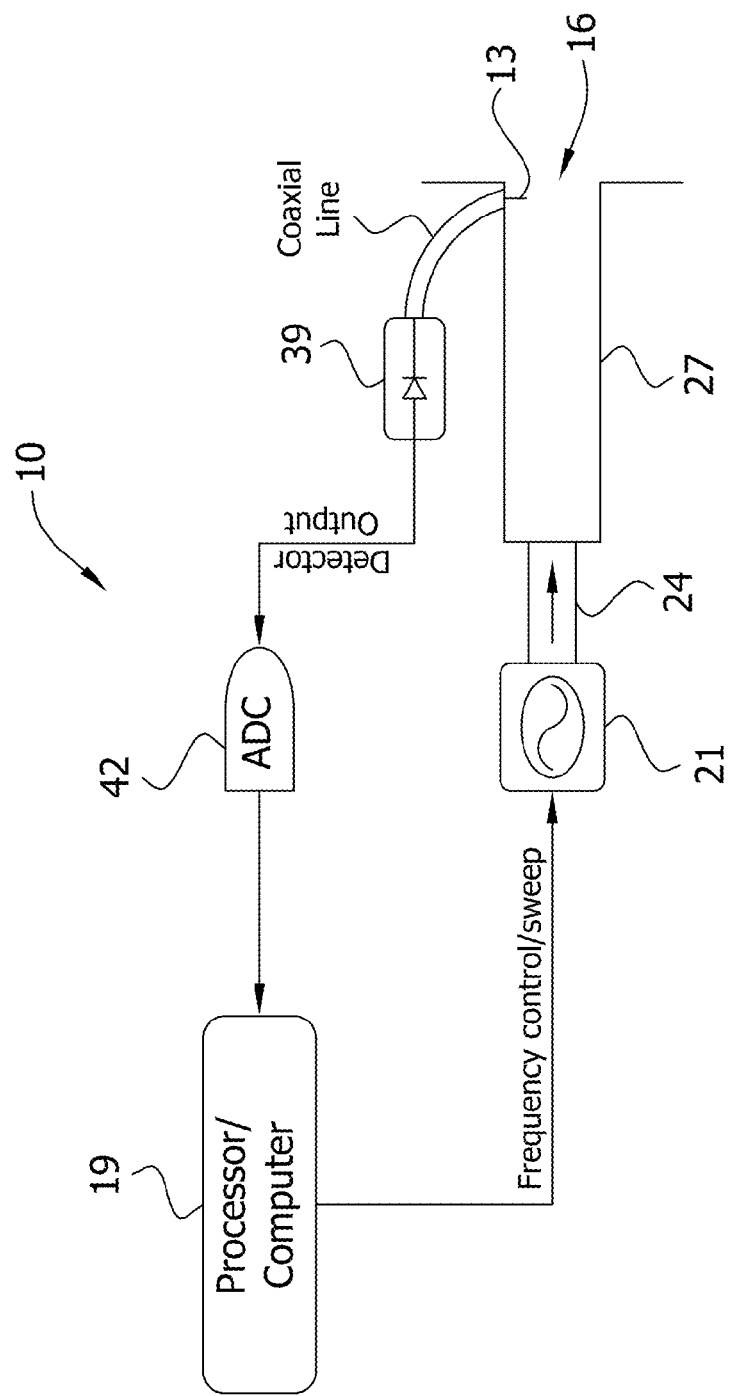
FIG. 1 is a block diagram illustrating a holographic imaging system utilizing an standing wave probe at an antenna aperture according to an embodiment of the invention.

Referring now to FIG. 1, a holographic imaging system 10 utilizes a standing wave probe 13 positioned at an antenna aperture 16. The imaging system 10, which embodies aspects of the invention, provides a robust and highly sensitive system, especially for use at relative high frequencies, such as those in the microwave and higher frequency range of the electromagnetic spectrum.

According to aspects of the invention, imaging system 10 produces images of virtually any object present in the system's field-of-view. When illuminated by the electromagnetic field, the target object causes at least some of the wave to scatter in different directions as a function of the object's material and geometric properties. For instance, the illuminating electromagnetic field is associated with an incident or irradiating microwaves or higher frequency wave. Because microwaves penetrate into dielectric materials, the imaging system 10 can view the interior of an object that comprises such a material. Likewise, imaging system 10 can detect and image an object concealed or otherwise located inside of a dielectric material. The imaging system 10 measures the scattered electric field at a number of discrete locations corresponding to a defined spatial domain (e.g., a planar, cylindrical, spherical, or arbitrarily shaped portion of a plane) located away from the object. In an embodiment, the standing wave probe 13 is located at antenna aperture 16 for sampling a reflected signal from the object.

The imaging system 10 depicts a reflectometer design that is similar to the homodyne reflectometer, for the output of imaging system 10 represents a real-valued signal proportional to the in-phase component of the reflected signal at the aperture of the antenna. However, the output is referenced to the aperture, thus no post-measurement phase-referencing (e.g., calibration) is required. For example, the reflected signal from the remote object is phase-referenced to the antenna aperture 16 at substantially all frequencies. In some critical applications, correcting for amplitude variation due to the response of the standing wave probe 13 and detector 39 across the frequency band may be required. However, in most cases this amplitude correction is not required because SAR algorithms are less sensitive to amplitude variation and more dependent on phase of the reflected signal.

As shown in FIG. 1, the imaging system 10 is integrated with other system components, including a processor 19, a signal source 21, and an isolator 24. The processor 19 is connected to the signal source 21, which is coupled to the isolator 24. In the illustrated embodiment, isolator 24 is coupled to a waveguide 27, having an aperture 16 for receiving electromagnetic energy and the waveguide 27 configured as a transmission line for electromagnetic energy. In one embodiment, waveguide 27 is metallic. And in one embodiment, the waveguide 27 is rectangular in shape. Other types of transmission lines, such as a coaxial cable, a micro-strip line, a stripline, or a dielectric waveguides may be utilized instead of a metallic waveguide.

The isolator 24 functions to transmit the very high frequency signal in one direction (i.e., toward the waveguide 27) while preventing transmission in the opposite direction. In this manner, isolator 24 prevents the reflected signals from flowing back toward the signal source 21, and absorbs these reflected signals. In an embodiment, the isolator 24 may be omitted if the signal source 21 has the capability of absorbing reflected signals.

The processor 19 may be embodied by a microprocessor, a microcontroller, a field programmable gate array, an application specific integrated circuit, a digital switching network made from discrete components for generating control signals, or the like. The processor 19 controls the frequency that the signal source 21 provides. For instance in an embodiment, the signal source 21 is a wideband electromagnetic wave source. The signal source 21 provides an electromagnetic signal having a frequency greater than a very high frequency (e.g., microwave). In another embodiment, the signal source 21 is at least one of a millimeter wave electromagnetic energy source, a wideband millimeter wave electromagnetic energy source, and a microwave electromagnetic energy source. The signal source 21 may be embodied by a sweep oscillator, a voltage-controlled oscillator, or any similar voltage signal source known in the art capable of providing a voltage source at microwave frequencies or above.

The signal source 21 provides electromagnetic energy that is transmitted through the isolator 24 and then through the waveguide 27 to be radiated to a remote object (not shown). In this manner, waveguide 27 acts as an antenna. The very high frequency signal transmitted toward the remote object is incident to the remote object. The remote object reflects the electromagnetic energy and scatters the electromagnetic energy in many directions depending on the shape, size, structure, and material composition of the remote object. Some of the scattered electromagnetic energy is reflected back towards the waveguide aperture 16 as a reflected signal. The reflected signal combines with the very high frequency incident signal to create a standing wave signal within the waveguide 27. The direction of travel of the incident signal is opposite to the direction of travel of the reflected signal. For example, the incident signal being transmitted toward the antenna aperture 16 within the waveguide 27 combines (i.e., adds) with the reflected signal to form a standing wave signal.

The sampled signal can be transmitted via a coaxial cable to a detector 39. The detector 39 is connected to the standing wave probe 13 and configured to receive the sampled reflected signal. The detector 39 provides an output signal that represents a real-valued signal proportional to an in-phase component of the reflected signal from the object. The detector 39 in one embodiment includes a diode whose output voltage is determined according to the following equation:

$$V \in |1+e^{-2j\beta d}\Gamma|^2 \in Re\{\Gamma\}, \quad (1)$$

where V is the detector 39 output voltage, β is a propagation constant in the waveguide 27, d is the distance of the standing wave probe 13 from the waveguide aperture 16, and Γ is the reflection coefficient at the aperture 16 of the waveguide 27. The detector 39 determines the reflection coefficient from the remote object measured at the aperture of the antenna 16, and the output voltage is proportional to a real component of the reflected signal. In an embodiment, the detector 39 determines the reflection coefficient of the object based on a plurality of measured voltages of the reflected signal from the object.

Figure 2A:
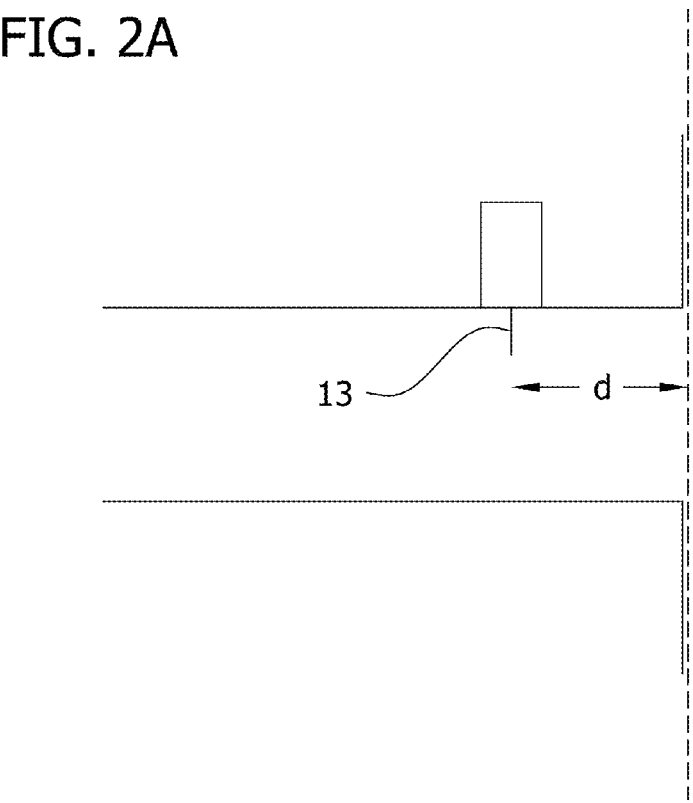
FIGS. 2A and 2B illustrates the standing wave probe of FIG. 1 positioned a distance d away from the antenna aperture.
Figure 2B:
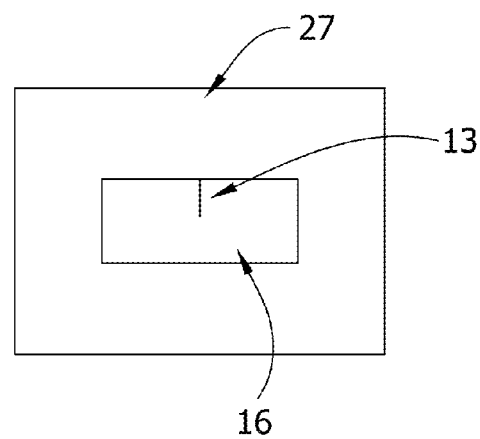
Figure 3:
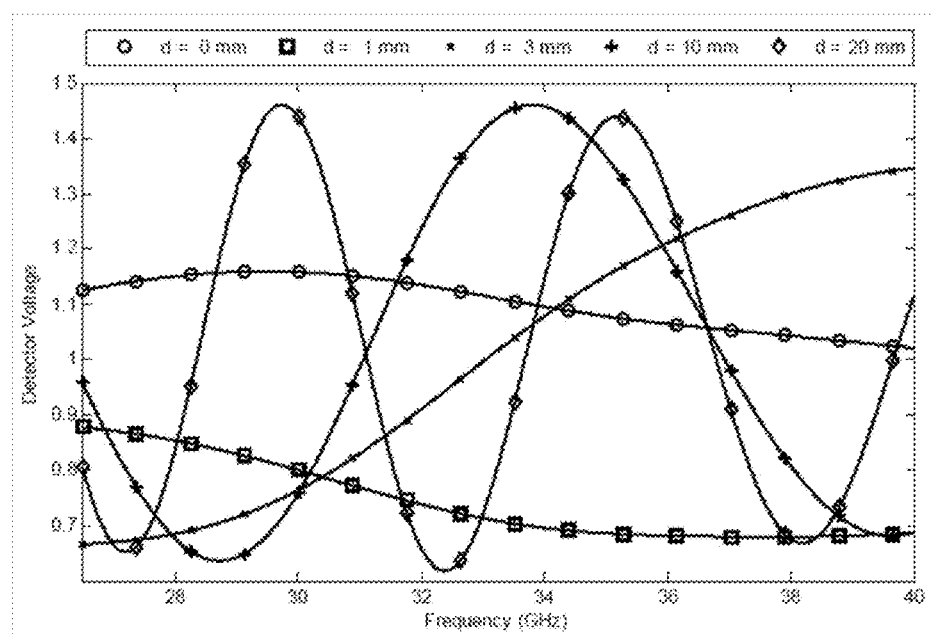
FIG. 3 illustrates a graph of a measured voltage versus frequency based on the distance an standing wave probe is located from an aperture.

The standing wave probe 13 samples a magnitude of the standing wave signal and the standing wave probe 13 is preferably positioned at or near the opening of the waveguide aperture 16. Referring to FIGS. 2A and 2B, the standing wave probe 13, for instance, can be positioned a distance d (shown in FIG. 2A) from the waveguide aperture 16. The distance the standing wave probe 13 is from the antenna aperture 16 (e.g., distance d) affects the output voltage of the detector 39. For example, as shown in FIG. 3, when the standing wave probe 13 is close to the antenna aperture 16, and there are no scattering objects in front of the aperture, (e.g., about d=0 mm to about d=20 mm for f=26.5 to 40 GHz), the detector 39 output voltage is relatively constant with frequency. Further, when the distance d is approximately equal to $\lambda_g/4$ (e.g., where $\lambda_g$ is the guide wavelength at the mid-band frequency of the voltage source 21), the output voltage is monotonic with frequency. Alternatively, when the distance d is increased to beyond $\lambda_g/2$ (e.g., about d=10 mm to about d=20 mm for f=26.5 to 40 GHz) the waveguide phase dispersion results in a nonlinear variation in the detector 39 output. The nonlinear variations will result in distortion of the 3D images.

Figure 4:
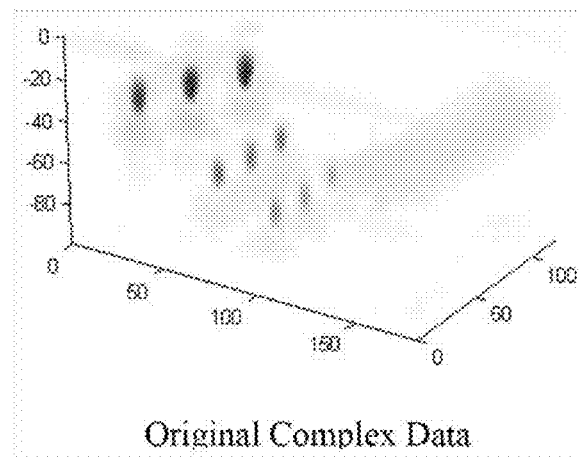
FIG. 4 illustrates exemplary three-dimensional (3D) synthetic aperture radar (SAR) images produced by the system of FIG. 1.
Figure 4:
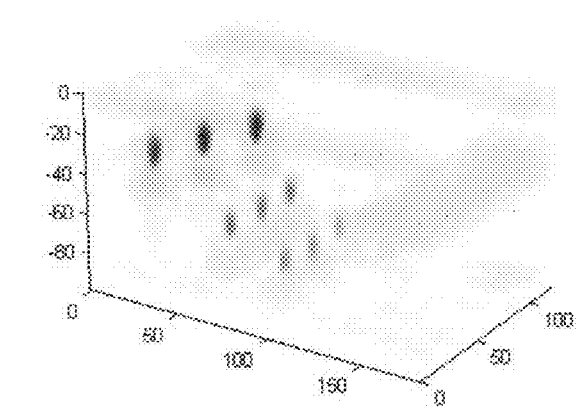
Figure 4:
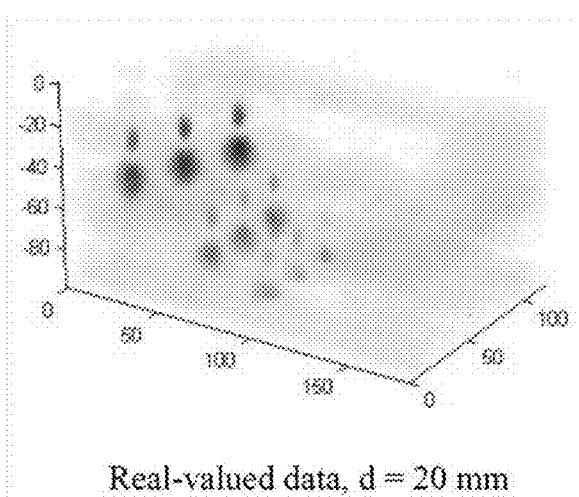

To test the effect of the distance d on the image, a sample containing rubber inserts in various heights was scanned using a heterodyne Q-band vector reflectometer in the frequency range 35 GHz to 45 GHz. FIG. 4 shows these 3D SAR images. The vector reflectometer produces the calibrated reflection coefficient ("Γ") referenced at the waveguide aperture 16. From these vector reflection coefficient measurements, a reference image measurement was produced. Then equation (1) was used to simulate the voltage output of the detector 39 with various distances d. The voltage output data was used to produce the 3D images. The 3D image obtained from the real-valued voltage measurement (at d=0) is very similar to the original image obtained from the vector reflection coefficient. However, when the distance d becomes larger than λ/2 (e.g., d=20 mm), severe distortion is noticed in the 3D images.

The standing wave probe 13 is coupled to waveguide 27 for sampling a magnitude of the standing wave. At least one characteristic representative of the remote object is determined as a function of the sampled magnitude of the standing wave. For instance, one characteristic representative of the remote object that can be determined based on a plurality of measured voltages is the reflectivity of the object.

Figure 5:
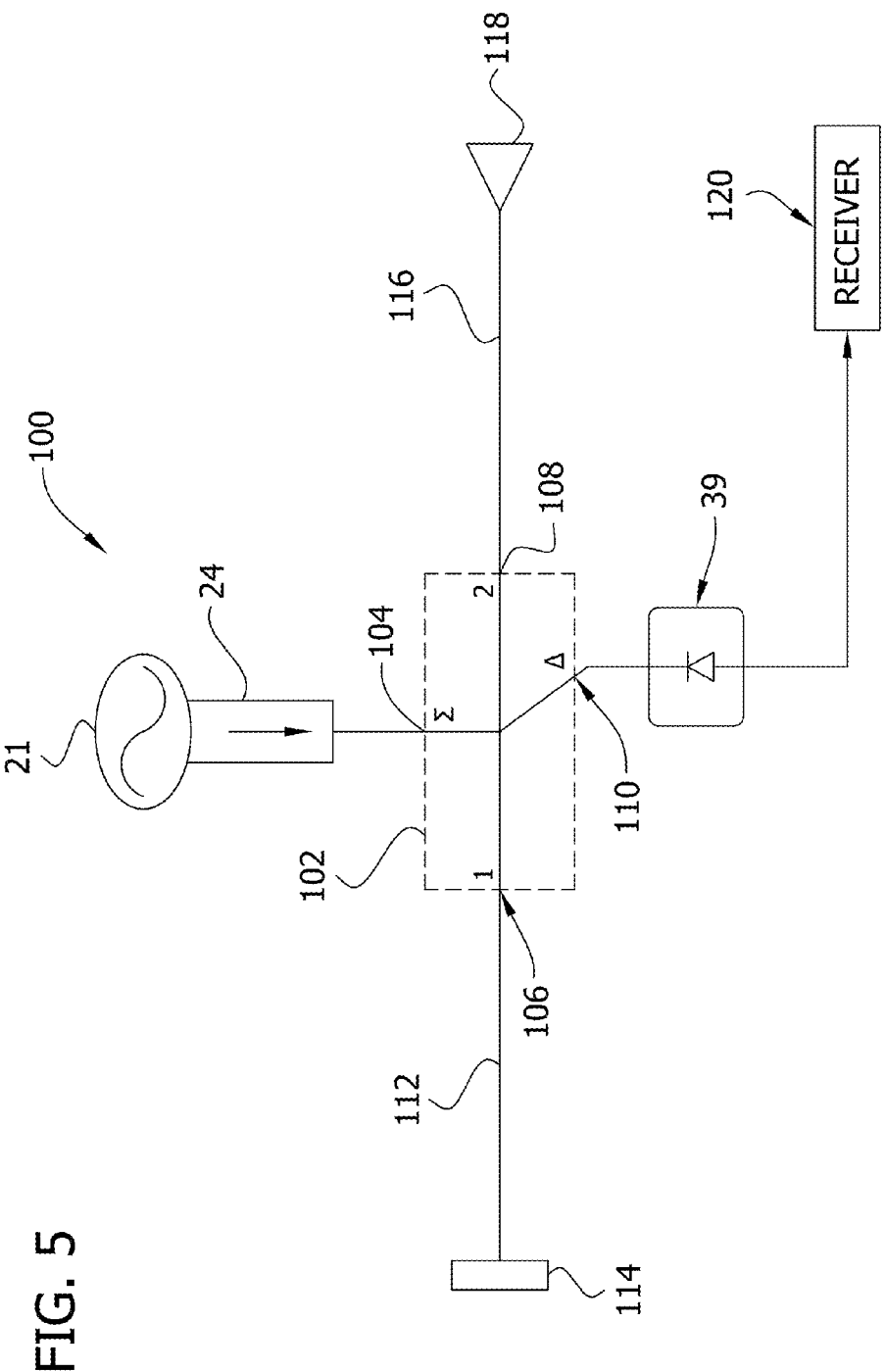
FIG. 5 illustrates a schematic of a wideband millimeter wave 3D imaging system utilizing a magic-tee according to an embodiment of the invention.

Referring to FIG. 1, in an embodiment, the detector 39 is connected to an analog-to-digital converter (ADC) 42, which converts the sampled analog signal into a digital form and then transmits the corresponding digital signal to the computer/processor 19. In another embodiment, as shown in FIG. 5, the ADC 42 is part of a receiver 120 that receives the transmitted output signal from detector 39. The receiver 120 receives a signal proportional to the magnitude of the standing wave.

Referring back to FIG. 1, in an embodiment, processor 19 includes a memory (not shown) to store the sampled digital signal. The processor 19 acquires the digitized signal either directly from the ADC 42 or retrieves the stored digitized signal from memory and processes the sampled measurements to generate an image for display. For example, the processor 19 executes an imaging algorithm for generating a multi-dimensional profile representative of the object based on the output signal from the detector. In an embodiment, the imaging algorithm is a 3D synthetic aperture radar (SAR) based imaging algorithm. Further, using special processing of the measurements, system 10 generates an image of the object's spatial and/or dielectric profiles on a display (not shown). For example, imaging system 10 generates and can display a multi-dimensional (e.g., 2D or 3D) image of the object, such as a holographic image.

One skilled in the art will recognize that various combinations of the integration schemes described above may be used to generate the incident signals, as well as to receive, store and process the reflected signals without deviating from the scope of the invention. For instance, system integration allows for a portable imaging system 10 to be deployed. In addition, one or more interfaces between the system components can be wireless interfaces (e.g., the signal can be acquired or displayed remotely).

Referring now to FIG. 5, a wideband three-dimensional (3D) imaging system 100 embodying aspects of the invention utilizes network device 102 having four ports: a summing port 104, a first port 106, a second port 108, and a delta port 110. In an embodiment, the summing port 104 is interchangeable with the delta port 110. In an embodiment, the network device 102 is a magic-tee. In other aspects, the invention utilizes a rat-race coupler. Furthermore, a combination of various components may be used to create an electrical circuit having similar functionality as the magic-tee or the rat-race coupler. The voltage source 21 is coupled to the isolator 24, and the isolator 24 is connected to the summing port 104 in the illustrated embodiment. The voltage source 21 provides a very high frequency signal to the summing port 104. A reference line 112 is connected to the first port 106 of the network device 102 and a reference load 114. In an embodiment, the reference load 114 may be a short circuit or an open-circuit. Generally, any load can be used as a reference load 114 as long as its response across the frequency band is relatively constant. The detector 39 is connected to the delta port 110, and an antenna line 116 is connected to an antenna 118 and the second port 108. Alternatively, the detector 39 may be connected to the summing port 104, and the source 21-isolator 24 combination can be connected to the delta port 110 without affecting the functionality of the system. The reference line 112 and the antenna line 116 have substantially the same electrical length and the same electrical properties (e.g., resistance, capacitance, inductance, and the like). Advantageously, the wideband 3D imaging system 100 is more practical at millimeter wave and higher frequencies compared to the imaging system 10 (shown in FIG. 1).

In an embodiment, the wideband 3D imaging system 100 may utilize waveguides. For example, the reference line 112 and the antenna line 116 may be waveguides. By having the reference line 112 and the antenna line 116 of substantially the same electrical length and substantially the same electrical properties, any linear or non-linear (dispersion) delay and phase shift from the antenna 118 to the detector 39 in the antenna line 116 are compensated for by the same linear or non-linear delay and phase shift in the reference line 112.

Referring to FIG. 5 utilizing a magic-tee 102, in this embodiment, a signal from the voltage source 21 is transmitted to the summing port 108 of magic tee 102 and the signal is split into two equal in-phase signals. A first signal travels on the reference line 112 toward the reference load 114. The reference load 114 is configured to reflect the first signal to produce a first reflected signal transmitted from the reference load 114 along the reference line 112 to the network device 102. A second signal travels along the antenna line 116 toward the antenna 118. The antenna 118 irradiates a remote object and captures any reflected signals from the remote object. The reflected signal from the antenna 118 and the signal reflected from the reference load 114 combine within the network device 102 to form a combined signal. In addition, the reference line 112 and the antenna line 116 are configured to compensate for any non-linear delay and any phase dispersion from the antenna 118 to the detector 39 and for any non-linear delay and phase dispersion from the reference load 114 to the detector 39. The detector 39 measures a signal proportional to the phase difference between the reflected signal and the reference signal. The output of the detector 39, in an embodiment, is sent to a receiver 120 (e.g., a voltmeter, a processing unit, an analog-to-digital converter, and the like). Further, the detector measures a voltage proportional to the phase difference between the reflected signal and the reference signal. Because the phase of the transmitted signal substantially equals the phase of the reference signal; and thereby cancels any signal dispersion. The detector 39 samples and measures the power in the combined signals from the delta port 110. The detector 39 provides an output voltage proportional to a real part of the combined signal.

A processor (e.g., processor 19) is configured to execute an imaging algorithm (e.g., a SAR 3D algorithm) to generate a multi-dimensional profile that is representative of the remote object based on the received output voltage from the detector 39.

Figure 6:
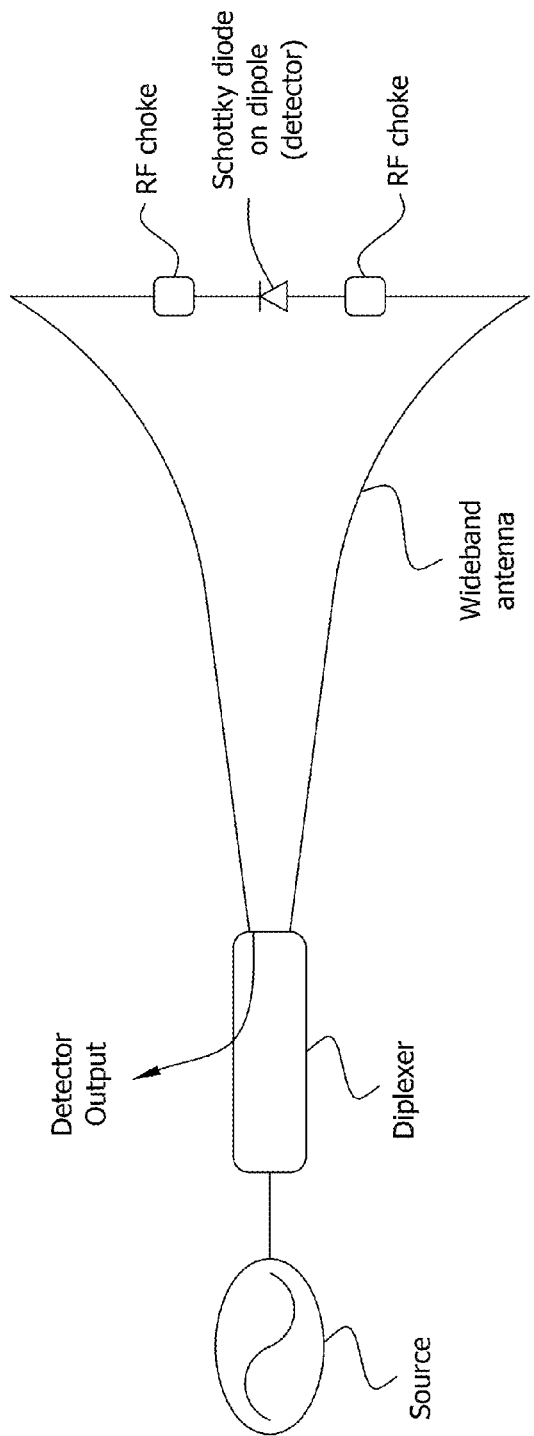
FIG. 6 illustrates an embedded detector on an antenna aperture according to an embodiment of the invention.

With many wideband antennas, especially those incorporated on printed circuit boards (e.g., such as a Vivaldi antenna), it is difficult to establish a reference plane (e.g. planar aperture) onto which the measurements are calibrated. Furthermore, these types of antennas demonstrate strong phase dispersion due to their relatively large bandwidth (BW). Consequently, phase referencing to the aperture (i.e., calibration) becomes tedious if not impossible for large bandwidths. Following the standing wave probe design, if a detector is placed at the aperture of these antennas, there will be no requirements for calibration. For example, in FIG. 6, a reflectometer embodying aspects of the present invention is shown, which includes a Schottky detector placed in the junction of a small dipole at the aperture of the wideband antenna. To transfer the detector output outside the antenna, the dipole is connected to the antenna through an RF choke. The detector output travels through the antenna to a diplexer where it is routed to a separate connector. Alternatively, the detector output may be routed independent of the antenna. Such a Vivaldi antenna may be used to image, for example, a concrete sample that includes a rebar. The produced 3D image can, for example, show the rebar, the relative size of the rebar, the location of the rebar within the concrete sample, and any corroded areas on the rebar.

In an alternative embodiment, the imaging system 10 may include a scanner, a detector probe, a scanning platform, a voltage source, a processor, and an analog-to-digital converter (ADC) (not shown). The imaging system 10 is configured for transmitting a signal incident to the object from the voltage source and receiving a signal reflected from an object by the detector probe. Further, the system 10 is configured to receiving an output voltage from the detector probe, where the output voltage represents a real-valued signal proportional to an in-phase component of the reflected signal from the object. In one embodiment, the imaging system 10 includes a magic-tee, and the detector probe is connected to a port located on the magic-tee.

In one embodiment the detector and/or source is kept stationary while connected to the imaging system 10 via flexible cables. The antenna is placed on the scanning platform and the platform is moved either laterally in an x-direction or a y-direction or an x-y direction. Alternatively, in another embodiment, the scanning platform may be moved radially from 1 to 360 degrees about the detector probe. In one embodiment, a waveguide aperture is utilized as the antenna, and the standing wave probe is connected to the antenna. The antenna is held stationary as the platforms scans the object. In an embodiment, a signal source can provide electromagnetic energy ranging in frequencies up to and including a tetrahertz frequency range. The standing wave probe, which is positioned near an antenna aperture, receives a signal reflected from an object; and the standing wave probe samples a magnitude of the reflected signal; and the standing wave probe outputs a voltage representing a real-valued signal proportional to an in-phase component of the reflected signal from the object.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A holographic imaging system comprising:
   an antenna having a transmission line coupled thereto, said transmission line coupled to the antenna at one end and coupled to a signal source at another end, said antenna defining an aperture through which a signal generated by the signal source is transmitted incident to an object located remotely from the aperture and through which a signal reflected from the object is received by the antenna aperture;

a standing wave probe located at a distance from the antenna aperture, wherein the distance of the standing wave probe from the antenna aperture is a fraction of a wavelength of the signal generated by the signal source such that the standing wave probe is phase-referenced to the antenna aperture for sampling the reflected signal;

a detector connected to the standing wave probe and configured to receive the sampled reflected signal, the detector providing an output signal that represents a real-valued signal proportional to an in-phase component of the reflected signal from the object and determining a reflection coefficient from the remote object measured at the aperture of the antenna; and a processor configured to execute an imaging algorithm for generating a multi-dimensional profile representative of the object based on the output signal from the detector.

2. The imaging system of claim 1, wherein the detector comprises a diode and wherein the output voltage of the diode is proportional to a real component of the reflected signal.

3. The imaging system of claim 1, further comprising a receiver operatively connected to the detector for receiving a signal proportional to the magnitude of the standing wave.

4. The imaging system of claim 1, wherein the standing wave probe is located adjacent to the aperture.

5. The imaging system of claim 1, wherein the distance of the standing wave probe from the aperture is defined as $d \leq \lambda_g/4$, where $\lambda_g$ is a guide wavelength at a mid-band frequency of the source signal.

6. The imaging system of claim 1, wherein the output signal is phase-referenced to the antenna aperture at substantially all frequencies.

7. The imaging system of claim 1, wherein the detector is further configured to determine the reflection coefficient of the object based on a plurality of measured voltages of the reflected signal from the object.

8. An imaging system, comprising:
a network device having a first port, a delta port, a second port, and a summing port, said network device having a signal source providing a very high frequency signal connected to the summing port, and said network device splitting the very high frequency signal into a first signal and second signal;

a reference line connected to the first port of the network device, the reference line receiving the first signal;

a reference load connected to the reference line, the reference load configured to reflect the first signal to produce a first reflected signal transmitted from the reference load along the reference line to the network device, wherein the first reflected signal comprises a reference signal;

an antenna line connected to the second port of the network device, the antenna line receiving the second signal, wherein the antenna line and the reference line are configured to have substantially equal electrical properties and substantially equal electrical lengths;

an antenna connected to the antenna line, the antenna configured to:
transmit the second signal to a remote object,
receive at least one second reflected signal from the remote object, and
transmit the second reflected signal along the antenna line to the network device, wherein the first reflected signal transmitted along the reference line and the second reflected signal transmitted along the antenna line combine within the network device to form a combined signal;

a detector connected to the delta port, said detector sampling the combined signal such that the detector measures a real part of the combined signal; and a processor configured to execute an imaging algorithm to generate a multi-dimensional profile representative of the object based on a received output voltage proportional to the real part of the reflected signal from the detector;

wherein the detector is configured for measuring a phase difference between the second reflected signal and the reference signal.

9. The imaging system of claim 8, further comprising an isolator connected between the signal source and the summing port.

10. The imaging system of claim 8, wherein the summing port is interchangeable with the delta port.

11. The system of claim 8 wherein the reference line and the antenna line are configured to have substantially the same electrical lengths and substantially the same electrical properties to compensate for delay and phase change from the antenna to the detector with the same delay and phase change from the reference load to the detector.

12. The imaging system of claim 8, wherein the network device is a magic-tee arrangement.

13. The imaging system of claim 8, wherein the phase of the second reflected signal substantially equals the phase of the reference signal and thereby cancels any signal dispersion.

14. The imaging system of claim 13, wherein the detector measures a voltage proportional to an in-phase component of the second reflected signal.

15. A method of imaging a remote object using an antenna, the method comprising:
transmitting a signal from a source via the antenna and incident to the object, the signal source configured to provide an electromagnetic energy source ranging in frequencies up to and including a tetrahertz frequency range;

receiving, by a detector probe, a signal reflected from the object, said detector probe positioned at a distance d from an aperture of the antenna such that the detector probe is phase-referenced to the aperture of the antenna, wherein the detector probe is configured to sample a magnitude of the reflected signal, and wherein d is defined as:
$d \leq \lambda_g/4$, where $\lambda_g$ is a guide wavelength at a mid-band frequency of the signal generated by the signal source;

determining a reflection coefficient from the remote object measured at the aperture of the antenna;

receiving a voltage output from the detector probe, wherein the voltage represents a real-valued signal proportional to an in-phase component of the reflected signal from the object; and generating, by a processor executing an imaging algorithm, a multi-dimensional profile representative of the object based on the received output voltage.

* * * * *